United States Patent [19]

Frers et al.

[11] 4,127,098

[45] Nov. 28, 1978

[54] STARTING DEVICE FOR AN INTERNAL COMBUSTION ENGINE, ESPECIALLY A CHAIN SAW ENGINE

[75] Inventors: Gerd Frers, Weinstadt-Grossheppach; Hans Nickel, Burgstetten; Klaus Henning, Stuttgart, all of Fed. Rep. of Germany

[73] Assignee: Firma Andreas Stihl, Waiblingen, Fed. Rep. of Germany

[21] Appl. No.: 779,558

[22] Filed: Mar. 21, 1977

[30] Foreign Application Priority Data

Mar. 20, 1976 [DE] Fed. Rep. of Germany ... 7608747[U]

[51] Int. Cl.² .............................................. F02N 1/00
[52] U.S. Cl. .......................... 123/185 BA; 123/185 A
[58] Field of Search ........... 123/185 R, 185 A, 185 B, 123/185 C, 185 CA

[56] References Cited

U.S. PATENT DOCUMENTS

| | | | |
|---|---|---|---|
| 1,858,583 | 5/1932 | Fahrney | 123/185 BA |
| 2,942,599 | 6/1960 | Irgens | 123/185 BA |
| 3,127,886 | 4/1964 | Rice | 123/185 BA |
| 3,252,452 | 5/1966 | Burkett et al. | 123/185 A |
| 3,814,073 | 6/1974 | Nakatani | 123/185 A |

FOREIGN PATENT DOCUMENTS

| | | | |
|---|---|---|---|
| 461,523 | 1931 | France | 123/185 A |
| 1,107,719 | 8/1955 | France | 123/185 BA |

*Primary Examiner*—Charles J. Myhre
*Assistant Examiner*—David D. Reynolds
*Attorney, Agent, or Firm*—Bacon & Thomas

[57] ABSTRACT

Disclosed is a starting device for an internal combustion engine having a stationary bearing axle attached to the engine, a pulley rotatably mounted on the axle and adapted for accepting a starting rope wrapped thereabout, a recessed coupling attached to the drive shaft of the engine, coaxially surrounding the rope pulley in its recess and having a plurality of inwardly facing ratchet teeth. The starting device comprises an elongated pawl pivotably mounted on one side surface of the pulley, the pivot point being spaced radially from the rotational axis of the pulley; a follower pin protruding from the pawl in the direction away from the pulley side surface at a point spaced from the pivot point; and a spring member elastically engaging the distal end of the bearing axle and comprising an elongated guide slot for receiving the follower pin, whereby the spring member retains the pulley on the bearing axle and swivels the pawl radially outwardly into engagement with the ratchet teeth in response to rotation of the pulley.

23 Claims, 8 Drawing Figures

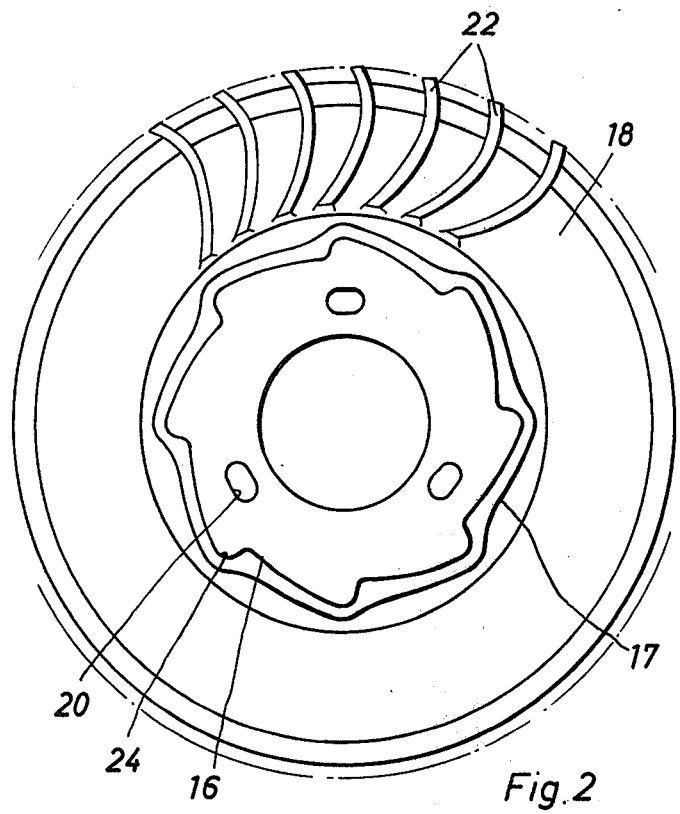
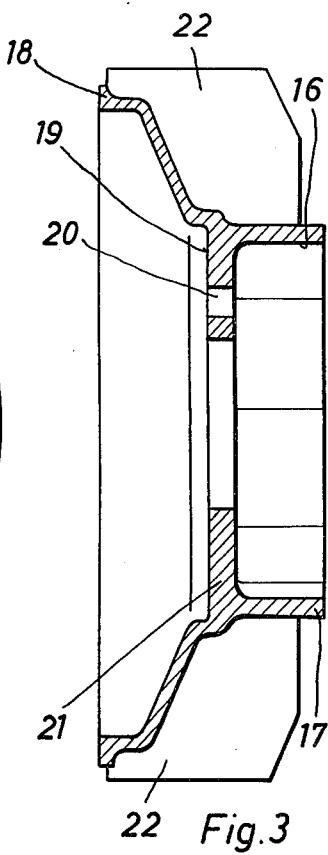
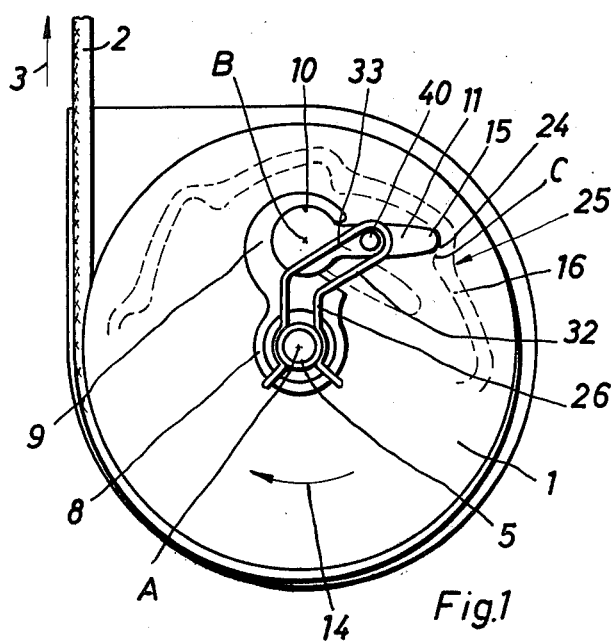
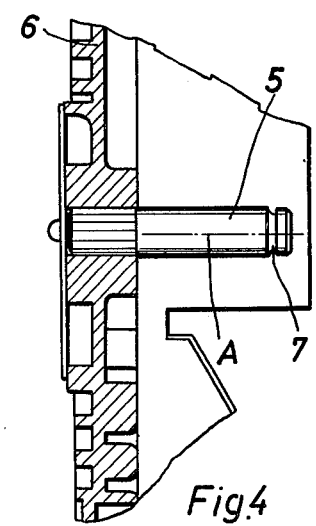
Fig. 2
Fig. 3
Fig. 1
Fig. 4

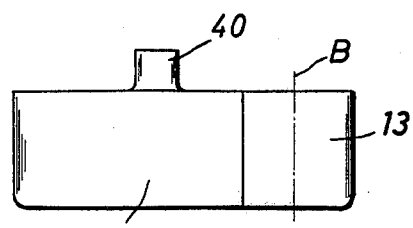
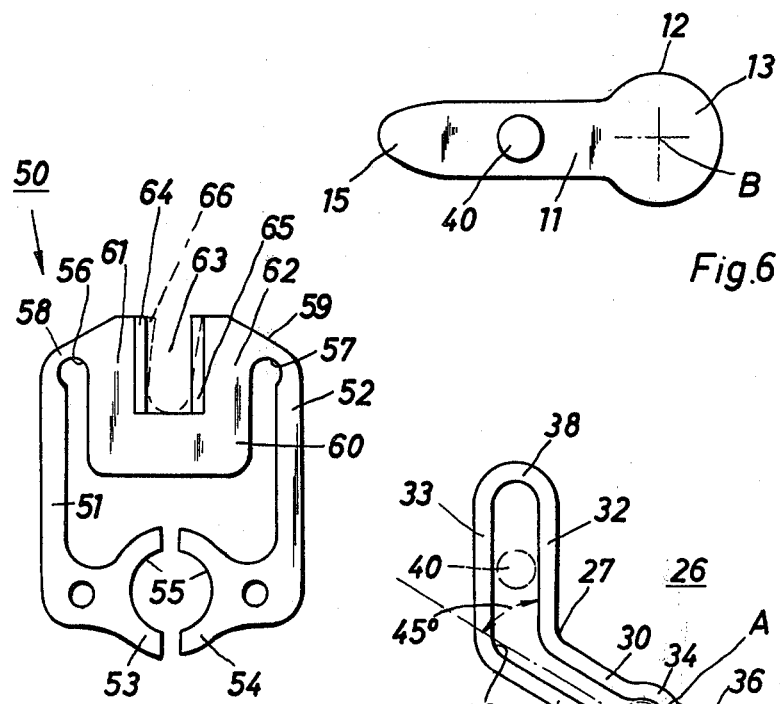

STARTING DEVICE FOR AN INTERNAL COMBUSTION ENGINE, ESPECIALLY A CHAIN SAW ENGINE

BACKGROUND OF THE INVENTION

The invention pertains to a starting device for an internal combustion engine, and more especially to a starting device for an engine adapted for driving a portable motorized chain saw. The device is of the type having a rope pulley which rotates as a wound-up rope is pulled off and is rotatably arranged on a stationary bearing axle, to which it is secured by a retention spring which engages the bearing axle with the ends of its legs, whereby the frictional connection which prevails between the retention spring and the bearing axle is used to radially outwardly swivel a pawl around an axis which is parallel to the bearing axis when the rope pulley is rotated in the starting direction. The pawl is supported on the rope pulley and engages it with the inner teeth of a recessed coupling, which is connected with the crankshaft of the internal combustion engine and which is coaxial to the bearing axle.

In a known starting device of this type, two pawls are provided which are arranged diametrically to the bearing axle. With cams arranged eccentrically to their swivel axes, the pawls engage in a dog plate, which is configured as a double arm lever and which is connected with the retention spring in form-locking relation. In other known starting devices, the cams which are provided for swivelling the pawl are arranged approximately in the middle between the end of the pawl and the swivel axis of the pawl, and engage in slits, which, in one of the known embodiments, are provided in the longitudinal direction of the dog plate, or are configured obliquely to its longitudinal direction. Because of the large number of components used in the known starting devices, there is a relatively large amount of play of these components in the assembled condition because of the unavoidable production tolerances. The consequence is a considerable wear of these components, necessitating an extensive inventory of spare parts.

SUMMARY OF THE INVENTION

One object of this invention is to provide an improved starting device of the above-described type.

Another object of the invention is to provide such a starting device which is considerably simpler in its construction, which requires fewer individual parts, and which has a lesser susceptability to breakdowns.

In accomplishing the foregoing objects, there has been provided in accordance with the present invention a starting device for an internal combustion engine having a stationary bearing axle attached to the engine, a pulley rotatably mounted on the axle and adapted for accepting a starting rope wrapped thereabout, a recessed coupling attached to the drive shaft of the engine, coaxially surrounding the rope pulley in its recess and having a plurality of inwardly facing ratchet teeth. The starting device comprises an elongated-pawl pivotably mounted on one side surface of the pulley, the pivot point being spaced radially from the rotational axis of the pulley; a follower pin protruding from the pawl in the direction away from the pulley side surface at a point spaced from the pivot point; and a spring member elastically engaging the distal end of the bearing axle and comprising an elongated guide slot for receiving the follower pin, whereby the spring member retains the pulley on the bearing axle and swivels the pawl radially outwardly into engagement with the ratchet teeth in response to rotation of the pulley.

In one embodiment of the present starting device, the spring member, preferably of spring wire, comprises essentially parallel legs connected together at their ends distant from the bearing axle, each leg being subdivided into an end section which engages the bearing axle and a guide section forming the edges of the guide slot. The two sections are preferably at an obtuse angle with respect to each other.

In another embodiment, the spring member is stamped from a substantially planar plate of resilient material, such as spring steel, and comprises a pair of legs terminating in opposing semi-circular shaped ring sections adapted for engaging with the bearing axle, and an inwardly directed slot formed in the yoke position connecting the legs.

Preferably, in the engagement position of the pawl, the tip of the pawl, the pivot axis of the pawl and the axis of rotation of the pulley lie on two planes which intersect along the pivot axis of the pawl at an angle of at least about 90°.

Other objects, features and advantages of the invention will become apparent from the detailed description of preferred embodiments which follows, when considered together with the attached figures of drawing.

BRIEF DESCRIPTION OF THE DRAWINGS

In the drawings:

FIG. 1 is a plan view of a portion of the starting device according to the invention illustrating the rope pulley of the starting device, with a portion of the teeth of the recessed coupling being shown in dashed lines;

FIG. 2 is an axial plan view of the recessed coupling of the starting device;

FIG. 3 is a side view of FIG. 2;

FIG. 4 is a cross-sectional view of a section of an apparatus housing, in which the bearing axis for the rope pulley in accordance with FIG. 1 is fastened;

FIG. 5 is a side view of the pawl used in the arrangement in accordance with FIG. 1;

FIG. 6 is a frontal view of the pawl shown in FIG. 5 in the direction of its swivel axis;

FIG. 7 is a plan view of an enlarged illustration of the obliquely bent retention spring in accordance with this invention; and FIG. 8 is a plan view of another embodiment of the retention spring.

DETAILED DESCRIPTION OF PREFERRED EMBODIMENTS

It is provided in accordance with this invention that the two legs of the retention spring are at least approximately parallel to each other, and each of the legs is subdivided by a bend into an end section which lies against the bearing axle and into a guide section which forms an obtuse angle with the former, whereby a follower pin, which is arranged between the swivel axis, at a distance therefrom, and the top of the pawl and which projects from the pawl, engages in the two oblique guide sections which are connected with each other. The device in accordance with this invention can preferably be configured so that, in the engagement position, the top of the pawl, the swivel axis of the pawl and the axis of rotation of the rope pulley lie on two planes, which intersect along the swivel axis. The planes form an angle of at least about 90°, and therefore result in an optimum angle of engagement of 90° during the transfer of force from the rope pulley to the recessed coupling. The retention spring in accordance with this invention assumes several functions, namely, the axial retention of the rope pulley, the override clutch, the retention of the pawl itself, and the function of the swivel means for the pawl. For each of these functions, a different component is required in the known starting devices. In addition, the spring can be prestressed against the pawl, in order to prevent a movement of the pawl as a result of vibration while in its rest position.

Turning now to the drawings, the illustrated device serves for the manual starting of an internal combustion engine, which is not illustrated in the drawings and which is preferably provided as the drive for a protable motorized chain saw or the like, which is also not illustrated. The starting device comprises a rope pulley 1 having a groove cut into its circumferential surface, serving to accept a rope 2. At its outer end, the rope is connected with a handle, which is not illustrated, and, upon pulling of this handle, the rope unwinds from the rope pulley 1 in the direction of arrow 3, whereby the pulley rotates in a clockwise direction in the view according to FIG. 1. For this purpose, the rope pulley 1 is rotatably mounted on a bearing pin 5, which is attached to the ventilator housing 6 of the otherwise not illustrated motorized chain saw, in the manner which is illustrated in FIG. 4. The longitudinal axis of the bearing pin 5 thus forms, at the same time, the axis of rotation of the rope pulley 1. In the free end section of bearing pin 5, which extends beyond the rope pulley 1 when it is attached, a circular groove is machined. The base of the groove can be rounded in the longitudinal direction of the pin.

On its reverse side, which faces the observer in the illustration in accordance with FIG. 1 and which faces away from the ventilator housing 6, the rope pulley 1 is provided with a projecting bearing hub 8 having a transition into a sickle-shaped bearing block 9, which is also cast onto the rope pulley and which contains a recess 10 which forms a part of a cylindrical sleeve. The bearing block 9 serves for receiving a pawl 11, which is illustrated in greater detail in FIGS. 5 and 6. This pawl can be made of a synthetic resinous material, for example, a polyamide such as is commericially available under the trademark Ultramid. The pawl manifests, for example, a thickened end section 13, which forms a cylindrical section on its outer surface 12. In the illustrated embodiment, the pawl 11 is inserted with this thickened end section into the recess of the bearing block so that it can be swivelled radially outwardly around the swivel axis which is indicated at B, when the rope pulley 1 is rotated in the starting direction, which is indicated with an arrow 14, as a result of longitudinal pulling exerted on the rope 2. The pawl 11 can also be configured as a rod, without the thickened end section.

In its swivel motion, the pawl 11 engages via its pawl tip 15 with the inner teeth 16, indicated by broken lines, formed by shell 17 of a recessed coupling which is preferably integrally connected with a ventilator wheel 18 or the flywheel. This structure contains a machined recess 19 on the motor side, which serves for receiving a flange, which is not illustrated and which is connected with the crank shaft of the internal combustion engine, into which three fastening screws (also not illustrated) can be inserted. These pass through elongated holes 20 in the base 21 of the carrier recess. Of the numerous ventilator vanes 22 which are curved in the radial direction of the ventilator wheel 18, some are illustrated in FIG. 2 in an axial plan view.

FIG. 1 shows the engagement position of the pawl 11, in which it engages via its pawl tip in a tooth base 24 of one of the teeth 25, which project radially toward the inside. The pawl thus carries along the recessed coupling 17 in the direction of the arrow 14. As soon as the internal combustion engine starts and the recessed coupling 17 overtakes the rope pulley 1 in the direction of the arrow 14, the pawl 11 is swivelled back radially toward the inside into its declutched position which is indicated by broken lines.

In order to make it possible to swivel the pawl 11 radially outwardly into the engagement position, which is illustrated by solid lines in FIG. 1, a retention spring 26 formed from round spring steel wire is provided, which is illustrated in greater detail in FIG. 7. The retention spring has two mutually parallel legs, of which each is divided by a bend, indicated by 27 and 28, respectively, into an end section 30 and 31, respectively, which lies against the bearing axle, and into a guide section 32 and 33, respectively, each of which forms an obtuse angle with its respective end section. In their seating areas 34 and 35, at which the end sections 30 and 31 engage at least partly in the groove 7 of the bearing pin 5, the legs are curved away from each other. The end regions 36 and 37 which are located subsequent to the seating areas 34 and 35 are spread away from each other and thus facilitate the insertion of the retention spring on bearing pin 5, so that the two legs of the retention spring are seated against the base of the groove with an elastic prestress and thus can produce a frictional closure which holds the retention spring in its particular position on the bearing pin.

A cylindrical follower pin 40 which is preferably integral with the pawl 11 engages between the two mutually parallel guide sections 32 and 33 of the retention spring, which are connected to each other through the common yoke region 38. When the rope drum 1 rotates in the drive direction 14, the follower pin 40 moves against the guide section 32 of the retention spring 26 and is then moved in the direction of the yoke 38 of the retention spring as a result of the oblique orientation of this guide section, which forms an angle of about 45° with the radial plane 41, indicated by a dot-dash line in FIG. 7 and positioned in the axis of rotation A, and thus forms, with its associated end section 30, an obtuse angle of about 135°. In this manner, a radially outwardly directed swivel motion of the pawl 11 in the counter-clockwise direction around the swivel axis B results, so that, with further rotary motion of the rope pulley, the tip 15 of the pawl 11 comes into engagement with the recessed coupling in front of the next available tooth 25 and can carry it along in the direction of drive motion. Thus, when the tip of the pawl 15 transmits the moment at point C of FIG. 1 in the form of compressive force, particularly advantageous transmission conditions result, because this point C, the swivel axis B of pawl 11, and the axis of rotation A of rope pulley 1 lie on two planes which intersect along swivel axis B at an angle of 90°. This results in a minimum of required compressive force which is to be absorbed by the pawl 11 and its bearing block 9, thus assuring a considerable lever arm for this compressive force. As a consequence, a very small amount of wear and tear results as well as correspondingly long maintenance-free operating periods for the present starting device.

The modified embodiment of a retention spring which is illustrated in FIG. 8 is particularly suitable for industrial mass production. This retention spring 50 is produced by stamping from an essentially flat spring steel plate of about 1.2 mm thickness. The legs 51 and 52, which correspond in their effect to the end sections 30 and 31, also run parallel to one another and terminate with two semi-circular rings 53 and 54 which, with their cylindrically shaped inner edge 55 and under the pressure of the spring-elastically widened legs 51, 52 lie against the base of the circular groove 7 (FIG. 4) in the bearing axle 5, and there transmit the necessary frictional connecting force when the retention spring 50 is inserted into this circular groove 7 in its operating position.

In order to make possible this spring-elastic stress which produces the necessary frictional pressure, the two legs 51 and 52 are connected with a common yoke 60 through two narrow webs 58,59, which are produced by rounded recesses 56,57. The yoke extends beyond the two rounded recesses 56 and 57 toward the two semi-circular rings 53 and 54 and thus makes it possible that the legs 51 and 52 possess a considerable bending elasticity. For the formation of two guide legs 61 and 62, which correspond to the guide sections 32 and 33 of the retention spring in accordance with FIG. 7, a cut 63 is provided in the yoke 60 directed toward the center or the axis A of the rope pulley and the support axle 5. In the assembled condition, the pin 40 which projects from pawl 11 then engages in this cut and swivels the pawl, in the manner described above in connection with FIGS. 1 to 7, for the purpose of engagement with the teeth 16 during the starting operation.

For purpose of obtaining an axial prestress, the edge zone 64 and 65 in the cut 63 can be bent from the plane of the drawing toward the pawl, in an inclined manner, so that they prevent the pawl from moving out of retention under the influence of the vibrations which occur during operation of the tool.

As a variation of the embodiment of cut 63, which is indicated by solid lines in FIG. 8, it is possible to configure the cut in accordance with the broken lines 66, so that it points a little past the center of the semi-conductor rings 53 and 54 and thus results in an inclined guide for pin 40 of pawl 11, anaglogous to FIG. 7.

What is claimed is:

1. A starting device for an internal combustion engine having a stationary bearing axle attached to the engine, a pulley rotatably mounted on the axle and adapted for accepting a starting rope wrapped thereabout, a recessed coupling attached to the drive shaft of the engine, coaxially surrounding the rope pulley in its recess and having a plurality of inwardly facing ratchet teeth, said starting device comprising:

an elongated pawl pivotably mounted on one side surface of the pulley, the pivot point being spaced radially from the rotational axis of the pulley;

a follower pin protruding from said pawl in the direction away from the pulley side surface at a point spaced from said pivot point; and a spring member elastically engaging the distal end of the bearing axle to retain the pulley on the bearing axle, said spring member comprising two essentially parallel legs rigidly connected together at a point spaced from the bearing axle and an elongated guide slot located between said legs for receiving said follower pin, whereby said spring member swivels the pawl radially outwardly into engagement with the ratchet teeth in response to rotation of the pulley.

2. The starting device as defined by claim 1, wherein said spring member comprises essentially parallel legs connected together at their ends distant from the bearing axle, each leg being subdivided into an end section which engages the bearing axle and a guide section forming the edges of said guide slot.

3. The starting device as defined by claim 2, wherein the end section of each leg is bowed away from the other leg in the region where the legs engage the bearing axle.

4. The starting device as defined by claim 3, wherein the end section of each leg is bent away from the other leg at its terminus at an angle of at least about 30°.

5. The starting device as defined by claim 4, wherein said angle is between about 45° to 60°.

6. The starting device as defined by claim 1, wherein in the engagement position of the pawl, the tip of the pawl, the pivot axis of the pawl and the axis of rotation of the pulley lie on two planes which intersect along the pivot axis of the pawl at an angle of at least about 90°.

7. The starting device as defined by claim 6, wherein said pawl comprises a cylindrically shaped enlargement at its base end and the pulley includes a raised bearing block on its side surface having a cylindrical recess for pivotably receiving said enlargement.

8. The starting device as defined by claim 2, wherein said spring member is comprised of spring wire.

9. The starting device as defined by claim 2, wherein the legs of said spring member include a bend, whereby the end section and the guide section are at an obtuse angle with respect to one another.

10. The starting device as defined by claim 9, wherein said angle is about 135°.

11. The starting device as defined by claim 1, wherein said spring member is stamped from a substantially planar plate of resilient material.

12. The starting device as defined by claim 11, wherein said spring member comprises a pair of legs terminating in opposing semi-circular shaped ring sections adapted for engaging with the bearing axle.

13. The starting device as claimed by claim 11, wherein the elongated guide slot comprises an inwardly directed slot formed in the yoke portion connecting the legs.

14. The starting device as defined by claim 11, wherein said spring member is biased toward said pawl.

15. The starting device as defined by claim 14, wherein the edge portions of the elongated guide slot are bent out of the plane of the spring member toward said pawl.

16. In an internal combustion engine including a stationary bearing axle attached to the engine, a pulley rotatably mounted on the axle and adapted for accepting a starting rope wrapped thereabout, a recessed coupling attached to the drive shaft of the engine, coaxially surrounding the rope pulley in its recess and having a plurality of inwardly facing ratchet teeth, and a starting device adapted for engaging with the ratchet teeth in response to rotation of the pulley, the improvement comprising the starting device comprising:

an elongated pawl pivotably mounted on one side surface of the pulley, the pivot point being spaced radially from the rotational axis of the pulley;

a follower pin protruding from said pawl in the direction away from the pulley side surface at a point spaced from said pivot point; and a spring member elastically engaging the distal end of the bearing axle to retain the pulley on the bearing axle, said spring member comprising two essentially parallel legs rigidly connected together at a point spaced from the bearing axle and an elongated guide slot located between said legs for receiving said follower pin, whereby said spring member swivels the pawl radially outwardly into engagement with the ratchet teeth in response to rotation of the pulley.

17. A starting device for an internal combustion engine having a stationary bearing axle attached to the engine, a pulley rotatably mounted on the axle and adapted for accepting a starting rope wrapped thereabout, a recessed coupling attached to the drive shaft of the engine, coaxially surrounding the rope pulley in its recess and having a plurality of inwardly facing ratchet teeth, said starting device comprising:

an elongated pawl pivotably mounted on one side surface of the pulley, the pivot point being spaced radially from the rotational axis of the pulley;

a follower pin protruding from said pawl in the direction away from the pulley side surface at a point spaced from said pivot point; and a spring member elastically engaging the distal end of the bearing axle to retain the pulley on the bearing axle, said spring member comprising an elongated guide slot for receiving said follower pin, whereby said spring member swivels the pawl radially outwardly into engagement with the ratchet teeth in response to rotation of the pulley, wherein in the engagement position of the pawl, the tip of the pawl, the pivot axis of the pawl and the axis of rotation of the pulley lie on the two planes which intersect along the pivot axis of the pawl at an angle of at least about 90°, and wherein said pawl comprises a cylindrically shaped enlargement at its base end and the pulley includes a raised bearing block on its side surface having a cylindrical recess for pivotably receiving said enlargement.

18. The starting device as defined by claim 17, wherein said spring member comprises essentially parallel legs connected at their ends distant from the bearing axle, each leg being subdivided into an end section which engages the bearing axle and a guide section forming the edges of said guide slot.

19. The starting device as defined by claim 18, wherein said spring member is comprised of spring wire.

20. The starting device as defined by claim 18, wherein the legs of said spring member include a bend, whereby the end section and the guide section are at an obtuse angle with respect to one another.

21. The starting device as defined by claim 17, wherein said spring member is stamped from a substantially planar plate of resilient material.

22. The starting device as defined by claim 21, wherein said spring member comprises a pair of legs terminating in opposing semi-circular shaped ring sections adapted for engaging with the bearing axle.

23. The starting device as defined by claim 21, wherein the elongated guide slot comprises an inwardly directed slot formed in the yoke portion connecting the legs.

* * * * *